United States Patent
Prezewowsky et al.

[15] 3,682,983
[45] Aug. 8, 1972

[54] PREPARATIONS OF Δ¹⁶-17 ETHINYL STEROIDS

[72] Inventors: Klaus Prezewowsky, Aarauer Strasse 10, 1 Berlin 45; Rudolf Wiechert, Endestrasse 38, 1 Berlin 39, both of Germany

[22] Filed: Nov. 12, 1969
[21] Appl. No.: 876,061

Related U.S. Application Data

[63] Continuation-in-part of Ser. No. 665,548, Aug. 31, 1967, abandoned.

[52] U.S. Cl. .......260/397.3, 260/239.55, 260/397.4, 260/239.55 C
[51] Int. Cl. ............................................C07c 169/22
[58] Field of Search...................................260/397.3

[56] References Cited

UNITED STATES PATENTS 3,492,321    1/1970    Crabbe...................260/397.4

*Primary Examiner*—Elbert L. Roberts
*Attorney*—Joseph F. Padlon

[57] ABSTRACT

This invention relates to a method of preparing Δ¹⁶-17-ethinyl steroids from 17-hydroxy-17-ethinyl steroids by elimination of water by means of phosphorus oxychloride in the presence of an organic base, characterized in that 2,4-lutidine is used as the organic base.

10 Claims, No Drawings

PREPARATION OF $\Delta_{16}$-17 ETHINYL STEROIDS

This is a continuation-in-part of copending application, Ser. No. 665,548, filed Aug. 31, 1967.

GENERAL DESCRIPTION OF THE INVENTION $\Delta^{16}$-17-ethinyl steroids are prepared by the elimination of water using phosphorus oxychloride in the presence of 2,4-lutidine on 17 $\alpha$ethinyl-17 $\beta$-hydroxy steroids.

The elimination of water from alkinols to form enines is known. The application of this reaction to 17 $\alpha$-ethinyl-17 $\beta$-hydroxy steroids has also been described in the literature. H.H. Inhoffen and co-workers (Ber. 71, 1032 (1938) have prepared the corresponding 17-ethinyl-$\Delta^{16}$-steroid from 17 $\alpha$-ethinyl-testosterone by reaction with formic acid, and E.B. Hershberg and co-workers (J. Am. Chem. Soc. 73, 5074 (195) ) have converted 17 $\alpha$-ethinyl-$\Delta^{5}$-androstene-3$\beta$, 17$\beta$-diol into the corresponding 17-ethinyl-$\Delta^{16}$-steroid by means of phosphorus oxychloride in the presence of pyridine.

It is a disadvantage of these methods that they generally give only mediocre yields. During the reaction with phosphorus oxychloride in pyridine, a chloroallene derivative is formed as a by-product, and its separation from the desired enine requires a great additional expenditure of effort.

It has now been found that the formation of by-products can be suppressed, and that the yield can be increased significantly by removing water by the use of phosphorus oxychloride in the presence of 2,4-lutidine instead of pyridine. The advantages achieved by means of 2,4-lutidine were particularly surprising because it was found simultaneously that the 2,6- and 3,4-lutidines, also collidine and quinoline, do not show such advantages over pyridine.

The 17-ethinyl-$\Delta^{16}$-steroids capable of being produced according to the method of the invention are valuable intermediates in the synthesis of pregnane derivatives.

The 17$\alpha$-ethinyl-17$\beta$-hydroxy-steroids which serve as starting materials may be substituted in the rings A,B,C,D, in the usual manner, the substituents including halogen, alkyl, acyl, primary and secondary acyloxy and/or alkyloxy groups. The steroid skeleton may further include keto groups, hetero atoms, and/or double bonds.

The nature of the pregnane derivatives which can be prepared by the reaction of the invention and the fact that the reaction can be thus used, is immediately apparent from the structure of the intermediate products. Thus, the new $\Delta^{16}$-17-ethinyl steroids are especially suitable for the preparation of the caproate of 17$\alpha$-hydroxy progesterone as shown, for example, in U.S. Pat. No. 2,753,360, and for the preparation of 19-nor-17$\alpha$-hydroxy progesterone caproate as disclosed in German Patent No. 1,074,582. These compounds act as strong gestagenes and are sold commercially under the designations "Proluton$^{(R)}$-Depot" and "Depostat$^{(R)}$." The intermediates are also obviously useful for the preparation of the strongly gestagenic compound 18-methyl-19-nor-$\Delta^{4}$-pregnen-17$\alpha$-ol-3,20-dion-17-acetate (Belgian Patent No. 714,593).

The therapeutically active end products can be prepared according to known methods by the synthesis of hydroxy progesterone side-chains (Helv. chim. Acta 26, page 1,004 (1943) and J. Amer. Chem. Soc. 80, page 6,110 (1958) ), and by the introduction of a $\Delta^{4}$-3-keto system according to the following scheme:

A. Buildup of Hydroxyprogesterone-Side-Chain:

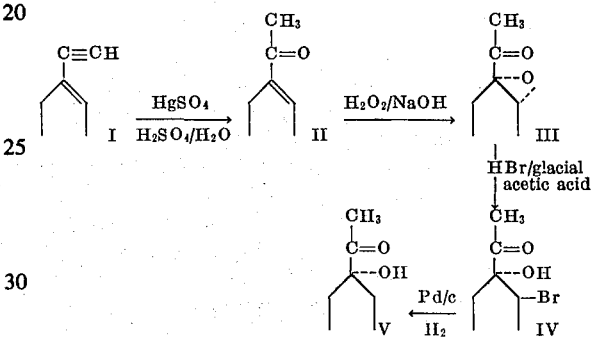

The ethinyl group (I) is hydrated in the presence of mercury sulfate and sulfuric acid, the $\Delta^{16}$-double bond (II) is epoxydized with $H_2O_2$/NaOH, and the epoxy ketone (III) obtained is treated with HBr in glacial acetic acid to introduce the 17$\alpha$-hydroxy group; for removal of the 16 $\beta$-bromine atom (IV) thus introduced, the product is hydrogenated in the presence of palladium on carbon. The building up of the side-chain is completed with compounds of the structure (V).

B. Introduction of $\Delta^{4}$-3-keto system:

a. the compounds with an aromatic A-ring (Examples 1 and 5 herein), afford protection of the 20-keto group through ketalization, to form the ketal (VIa) are reduced to compound (VIIa) (Birch, Quart. Rev. London, Vol. 12, Page 17 (1958) ). After the reaction is finished, the esterification of the free 19-nor-17-hydroxy compound (VIIa) is completed with caproic acid anhydride or acetic anhydride to form compound (VIIIa):

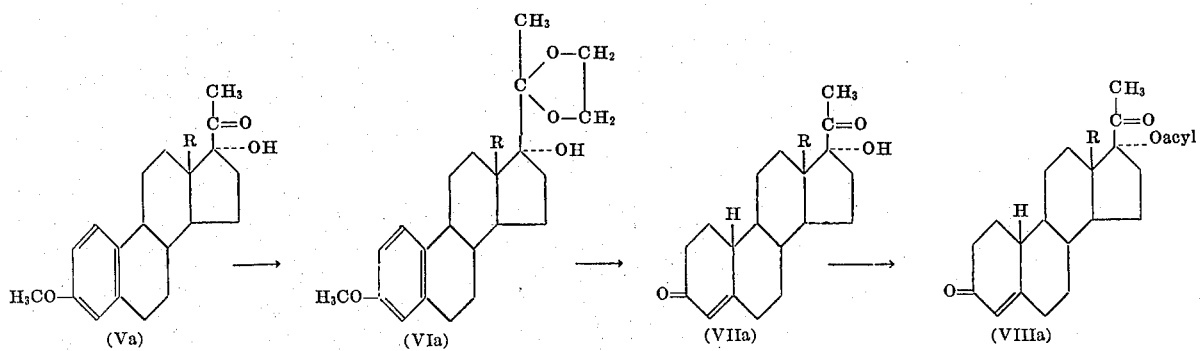

R = CH₃; Acyl = Capronoyl (Depostat$^{(R)}$)
R = C₂H₅; Acyl = Acetyl b. The compounds with saturated A-rings (Examples 2–4 herein), after esterification of the free 17-hydroxy group, are dehydrogenated in the 4,5-position either chemically or microbiologically:

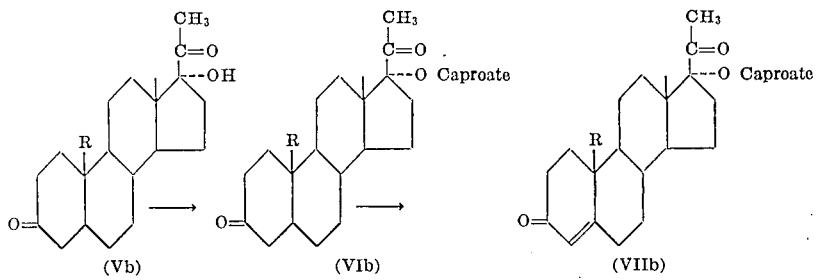

R = H or CH₃; R = H (Depostat$^{(R)}$; R = CH₃ (Proluton$^{(R)}$-Depot).

The following examples are illustrative of the method for preparing compounds of this invention:

EXAMPLE 1

A solution of 5 g 17α-ethinyl-estradiol-3-methyl ether in 30 ml 2,4-lutidine is mixed with 5 g phosphorus oxychloride, and the mixture is stirred for 16 hours at room temperature under nitrogen. The reaction mixture is stirred thereafter into ice water acidulated with sulfuric acid, the precipitated substance is extracted with ether, and the organic phase is washed with sodium bicarbonate solution and water, dried over sodium sulfate, and evaporated to dryness. The residue is recrystallized from methanol over carbon. There are obtained 3.1 g (66percent of theory) 17-ethinyl-Δ$^{1,3,5(10),16}$3-ol-methyl ether of melting point 153° – 155° C.

EXAMPLE 2

A mixture of 42.8 g 17α-ethinyl-19-nor-5α-androstane-17β-ol-3-one, 400 ml 2,4-lutidine, and 42.8 ml freshly distilled phosphorus oxychloride is stirred at 50° C for five hours. The mixture thereafter is stirred into ice water acidulated with hydrochloric acid, the precipitate formed is filtered off with suction and taken up in methylene chloride, and the solution is washed with water until neutral. The solution is dried over sodium sulfate and the solvent is evaporated. The residue is chromatographed on silica gel. The product, when recrystallized from ethyl acetate, is 24.5 g (61 percent of theory) 17-ethinyl-19-nor-Δ$^{16}$-5α-androstene-3-one of melting point 148.5° – 150.5° C.

EXAMPLE 3

10 g 17-α-ethinyl-5α-androstane-17-ol-3-one are reacted and worked up in a manner analogous to the procedure of Example 2. There are obtained 6.5 g 17-ethinyl-Δ$^{16}$-5α-androstene-3-one of melting point 177° – 179° C.

EXAMPLE 4

According to the method of Example 2, 1.3 g 17-ethinyl-19-nor-Δ$^{16}$-5β-androstene-3-one are obtained from 2 g 17α-ethinyl-19-nor5β-androstane-17β-ol-3-one.

EXAMPLE 5

46.9 g 17α-ethinyl-18-methyl-Δ$^{1,3,5(10)}$-estratriene-3,17β-diol-3-methyl ether, M.P. 98° – 99° C, prepared from 18-methyl-Δ$^{1,2,5(10)}$-estratriene-3,17β-diol-3-methyl ether (Liebigs Annalen 702, 141-148 (1967)) by Oppenauer oxidation to 18-methyl-Δ$^{1,3,5(10)}$-estratriene-3-ol-17-one-3-methyl ether (M.P. 148.5° – 149.5° C) and ethinylation of the 17-ketone in terahydrofuran by means of acetylene in the presence of lithium and ethylene diamine, are dissolved in 500 ml 2,4-lutidine which was distilled over barium oxide. The solution is cooled to 0° C, mixed with 47 ml phosphorus oxychloride and stirred under nitrogen for 18 hours at room temperature, and thereafter for 8 hours at 70° C. The mixture is then put into ice water acidulated with hydrochloric acid, the precipitate is filtered off, taken up in methylene chloride, and the solution is washed neutral with water. After drying of the solution over sodium sulfate and evaporation of the solvent, the residue is chromatographed on 800 g silica gel by means of petroleum ether/acetone (from 0 percent acetone to 5 percent acetone). The product, when recrystallized from methanol over carbon, consists of 18 g 17-ethinyl-18-methyl-Δ$^{1,3,5,(10),16}$-estratetraene-3-ol-methyl ether of melting point 94° – 96° C.

What is claimed is:

1. The method of preparing aΔ$^{16}$-17-ethinyl steroid selected from the group consisting of the androstane and estrane series which comprises reacting said steroid with phosphorus oxychloride in the presence of 2,4-lutidine to eliminate water therefrom.

2. The method according to claim 1 in which the starting material used is a 17-hydroxy-17-ethinyl steroid of the general formula

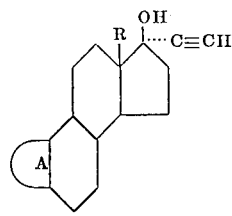

wherein R is alkyl, and preferably lower alkyl, the ring (A)

is present in one of the structural forms selected from the group consisting of:

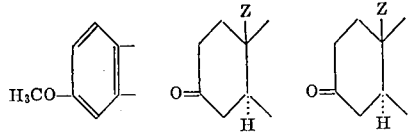

and Z is hydrogen or methyl.

3. The method according to claim 2 in which the starting material employed is 17α-ethinyl-estradiol-3-methyl ether.

4. The method according to claim 2 in which the starting material employed is 17α-ethinyl-19-nor-5α-androstane-17β-ol-3-one.

5. The method according to claim 2, in which the starting material employed is 17α-ethinyl-5α-androstane-17β-ol-3-one.

6. The method according to claim 2 in which the starting material employed is 17α-ethinyl-19-nor-5β-androstane-17β-ol-3-one.

7. The method according to claim 2, in which the starting material employed is 17α-ethinyl-18-methyl-$\Delta^{1,3,5(10)}$-estratriene-3,17β-diol-3-methyl ether.

8. The compound 17-ethinyl-19-nor-$\Delta^{16}$-5α-androstene-3-one.

9. The compound 17-ethinyl-$\Delta^{16}$-5α-androstene-3-one.

10. The compound 17-ethinyl-19-nor-$\Delta^{16}$-5β-androstene-3-one.

* * * * *